US012246510B2

(12) United States Patent
Adami

(10) Patent No.: US 12,246,510 B2
(45) Date of Patent: Mar. 11, 2025

(54) SINGLE FACER WITH HEATING PLATES FOR PRODUCING CORRUGATED BOARD

(71) Applicant: Fosber S.p.A., Pescaglia (IT)

(72) Inventor: Mauro Adami, Viareggio (IT)

(73) Assignee: FOSBER, S.P.A., Pescaglia (IT)

( * ) Notice: Subject to any disclaimer, the term of this patent is extended or adjusted under 35 U.S.C. 154(b) by 0 days.

(21) Appl. No.: 18/038,306

(22) PCT Filed: Nov. 19, 2021

(86) PCT No.: PCT/EP2021/082300
§ 371 (c)(1),
(2) Date: May 23, 2023

(87) PCT Pub. No.: WO2022/112128
PCT Pub. Date: Jun. 2, 2022

(65) Prior Publication Data

US 2023/0405962 A1 Dec. 21, 2023

(30) Foreign Application Priority Data

Nov. 24, 2020 (IT) ........................ 102020000028172

(51) Int. Cl.
*B31F 1/00* (2006.01)
*B31F 1/28* (2006.01)

(52) U.S. Cl.
CPC ............ *B31F 1/285* (2013.01); *B31F 1/2818* (2013.01); *B31F 1/2836* (2013.01); *B31F 1/2872* (2013.01)

(58) Field of Classification Search
CPC ................. B31F 1/36; B31F 1/28; B31F 1/20
USPC ......................................................... 493/332
See application file for complete search history.

(56) References Cited

U.S. PATENT DOCUMENTS

| | | | |
|---|---|---|---|
| 5,156,714 A | 10/1992 | Thomas et al. | |
| 5,512,020 A | 4/1996 | Yasui et al. | |
| 6,745,807 B2 | 6/2004 | Ishibuchi et al. | |
| 8,714,223 B2 | 5/2014 | Adami et al. | |
| 10,618,242 B2 | 4/2020 | Adami | |

FOREIGN PATENT DOCUMENTS

| | | | | |
|---|---|---|---|---|
| CN | 106739185 | * | 5/2017 | ................ B31F 1/28 |
| CN | 106739185 B | | 2/2019 | |
| CN | 111169101 A | | 5/2020 | |
| CN | 1111169101 | * | 5/2020 | ................ B31F 1/20 |
| EP | 0260525 A2 | | 3/1988 | |
| EP | 0260526 A2 | | 3/1988 | |
| EP | 1270472 A2 | | 1/2003 | |
| EP | 1757548 A1 | | 2/2007 | |
| EP | 3375601 | * | 9/2018 | ................ B31F 1/36 |
| EP | 3375601 A1 | | 9/2018 | |
| WO | 9830383 A1 | | 7/1998 | |

(Continued)

*Primary Examiner* — Jacob A Smith
(74) *Attorney, Agent, or Firm* — Breiner & Breiner, LLC

(57) ABSTRACT

The single facer includes a first feed path for feeding a first paper web towards a corrugating nip defined between a first corrugating roller and a second corrugating roller. The single facer also includes a second feed path for feeding a second paper web towards a pressure nip defined between the first corrugating roller and a pressure member co-acting with the first corrugating roller. A respective heating system is provided along each feed path. Each heating system includes at least a pair of heating plates.

25 Claims, 8 Drawing Sheets

(56) References Cited

FOREIGN PATENT DOCUMENTS

| | | | | |
|---|---|---|---|---|
| WO | WO9830383 | * | 7/1998 | ................ B31F 1/28 |
| WO | 2016169675 | A1 | 10/2016 | |
| WO | WO2016169675 | * | 10/2016 | ................ B31F 1/28 |

* cited by examiner

SINGLE FACER WITH HEATING PLATES FOR PRODUCING CORRUGATED BOARD

TECHNICAL FIELD

The present invention relates to machines for producing corrugated board. Particularly, the invention relates to improvements to the so-called single facers.

Background to the Invention

Corrugated board is produced from sheets of flat paper unwound from master rolls. In its simplest form, corrugated board is formed by a web of flat paper and a web of corrugated paper, glued together at the crests of the flutes of the corrugated paper web. The resulting board web is called "single face corrugated board". Usually, a second web of flat paper is attached to this base structure, i.e., glued to the corrugated paper web so that this latter is interposed between the two flat paper webs, which are also called liners. In some cases, other webs are added to this structure formed by three paper webs, resulting in a sequence of corrugated paper webs interposed between flat paper webs.

Single face corrugated board is produced by a single facer, that comprises a pair of meshing corrugating rollers, between which a first flat paper web is fed. The first flat paper web is hot-deformed in the nip between the two corrugating rollers and becomes a corrugated paper web. Glue is applied to the crests of the flutes of the corrugated paper web adhering to one of the corrugating roller, and a flat paper web is pressure- and hot-applied to the corrugated paper web provided with glue.

A pressure unit is provided for gluing the corrugated paper web and the flat paper web together, this unit comprising at least a pressure member that is pressed against one of the corrugating rollers. The flat paper web and the corrugated paper web are fed between the corrugating roller and the pressure member.

U.S. Pat. Nos. 10,618,242 and 8,714,223 disclose examples of single facers.

Both the paper sheets are preheated before entering the single facer, in order better to be glued together. To this end, heating rollers are usually used, inside which steam flows and around which the paper web is driven. Examples of single facers with heating rollers are disclosed in U.S. Pat. Nos. 5,512,020, 6,745,807, EP1757548, EP1270472. In order to vary the amount of heat transferred to the paper web from the heating roller, guide rollers are provided, which can take different angular positions around the rotation axis of the heating roller and thereby modify the arc of contact between heating roller and paper web.

These preheating systems have some drawbacks and limits. In particular, condensate is formed inside the heating roller by the transfer of latent vaporization heat from the steam to the paper web through the cylindrical wall of the heating roller. Because of centrifugal force, condensate forms a layer on the inner surface of the cylindrical wall of the heating roller. The condensate layer may significantly hinder the transfer of heat from steam to corrugated board, thus making the heating system inefficient.

Moreover, the systems for varying the arc of contact between heating roller and paper web have high inertia and do not allow to vary the arc of contact quickly. Due to the above, the single facer is not able to modify its operating conditions fast. For example, it is not able to react promptly to the variation of the web feed speed that would require a corresponding prompt variation of the arc of contact between paper web and heating rollers. Due to the delay in adjusting the arc of contact between paper web and heating roller, sometimes long paper portions could be heated too much or too little, and this results in defects in the finished product and, consequently, in wastes.

The use of heating rollers requires a high number of guide rollers for the paper webs. The guide rollers take heat away from the paper web, thus increasing the energy consumption of the single facer. In fact, to achieve the temperature required for correct gluing, it is necessary to provide more heat, part of which is taken by the drive rollers.

Moreover, the guide rollers, as well as the heating rollers, have high moment of inertia, thus generating significant tension fluctuations in the paper web, especially during speed changes. These tension fluctuations result in an incorrect operation of the single facer and in production defects.

In some less recent single facers, curved heating plates have been used instead of the heating rollers. A schematic example of this kind of single facer is disclosed in EP0260526. This single facer has neither systems for controlling the arc of contact between paper web and heating plate, nor systems for adjusting and controlling the tension of the paper webs. The temperature adjustment shall be performed by means of heating rollers and corresponding adjustment members, not shown, for adjusting the arc of contact between roller and paper, arranged upstream of the heating plates.

EP0260525 discloses a single facer where the paper web forming the liner (flat web) of the corrugated board is preheated by a heating plate, whilst the web to corrugate is preheated by a heating roller. Systems are not provided for adjusting the arc of contact between paper webs and preheating members, and it is therefore necessary to provide a further heating roller arranged upstream of the heating plate and provided with adjustment members, not shown, for adjusting the arc of contact between paper and heating roller.

U.S. Pat. No. 5,156,714 discloses a single facer where the paper web (flat web) forming the liner is preheated by heating rollers, whilst the paper web to corrugate is preheated by one heating plate. The arc of contact between paper web and heating plate is adjusted through a guide roller that translates with respect to the heating plate. Adjusting the heating conditions is a slow process, resulting in an unsatisfactory system.

EP3,375,601 discloses a single facer where the paper web to corrugate is preheated by a heating roller, whilst the flat web forming the liner is heated by a heating plate having two opposite convex surfaces, along which the paper web is fed. In order to change the arc of contact between the paper web and the two active surfaces of the heating plate, two guide rollers are provided with respective actuators, which modify the position of each guide roller with respect to the heating plate. In this case again, the operations of paper heating and adjusting temperature are inefficient.

Therefore, the prior art preheating systems with heating plates are, in general, poorly efficient, difficult to be controlled, and slow, and can cause undesired tension fluctuations in paper webs.

A need therefore exists, for a single facer with a heating system, i.e., a system for preheating paper webs, that completely or partially overcomes the drawbacks of the prior art single facers.

SUMMARY

In order to solve or alleviate one or more drawbacks of the single facers of the prior art, a single facer is provided comprising a first feed path for feeding a first paper web towards a corrugating nip defined between a first corrugating roller and a second corrugating roller. The single facer also comprises a second feed path for feeding a second paper web towards a pressure nip defined between the first corrugating roller and a pressure member co-acting with the first corrugating roller. A respective heating system is provided along each feed path. Each heating system comprises at least a pair of heating plates, on which the respective paper web is fed.

In advantageous embodiments, systems are provided for adjusting the angular position of each heating plate with respect to a bearing structure, so as to adjust the arc of contact between the respective paper web and the heating plate.

Particularly, in some embodiments a single facer is provided comprising a first feed path for feeding a first paper web towards a corrugating nip defined between a first corrugating roller and a second corrugating roller. The single facer also comprises a first heating system arranged along the first feed path and adapted to heat the first paper web upstream of the corrugating nip.

A second feed path is also provided for feeding a second paper web towards a pressure nip defined between the first corrugating roller and a pressure member co-acting with the first corrugating roller. A second heating system is provided along the second feed path and adapted to heat the second paper web upstream of the pressure nip.

A glue dispenser co-acts with the first corrugating roller to apply glue to crests that are formed on the first paper web by the first corrugating roller and the second corrugating roller.

The first heating system advantageously can comprise at least a first heating plate and a second heating plate. The second heating system advantageously can comprise at least a third heating plate and a fourth heating plate. Each heating plate has an active surface adapted to contact the respective paper web; its angular position may be advantageously adjusted to modify promptly the arc of contact between the heating plate and the respective paper web, so that the paper web is heated properly.

BRIEF DESCRIPTION OF THE DRAWING

The invention will be better understood by following the description below and the attached drawing, showing a non-limiting embodiment of the invention. More specifically, in the drawing.

DETAILED DESCRIPTION

Figure 1:
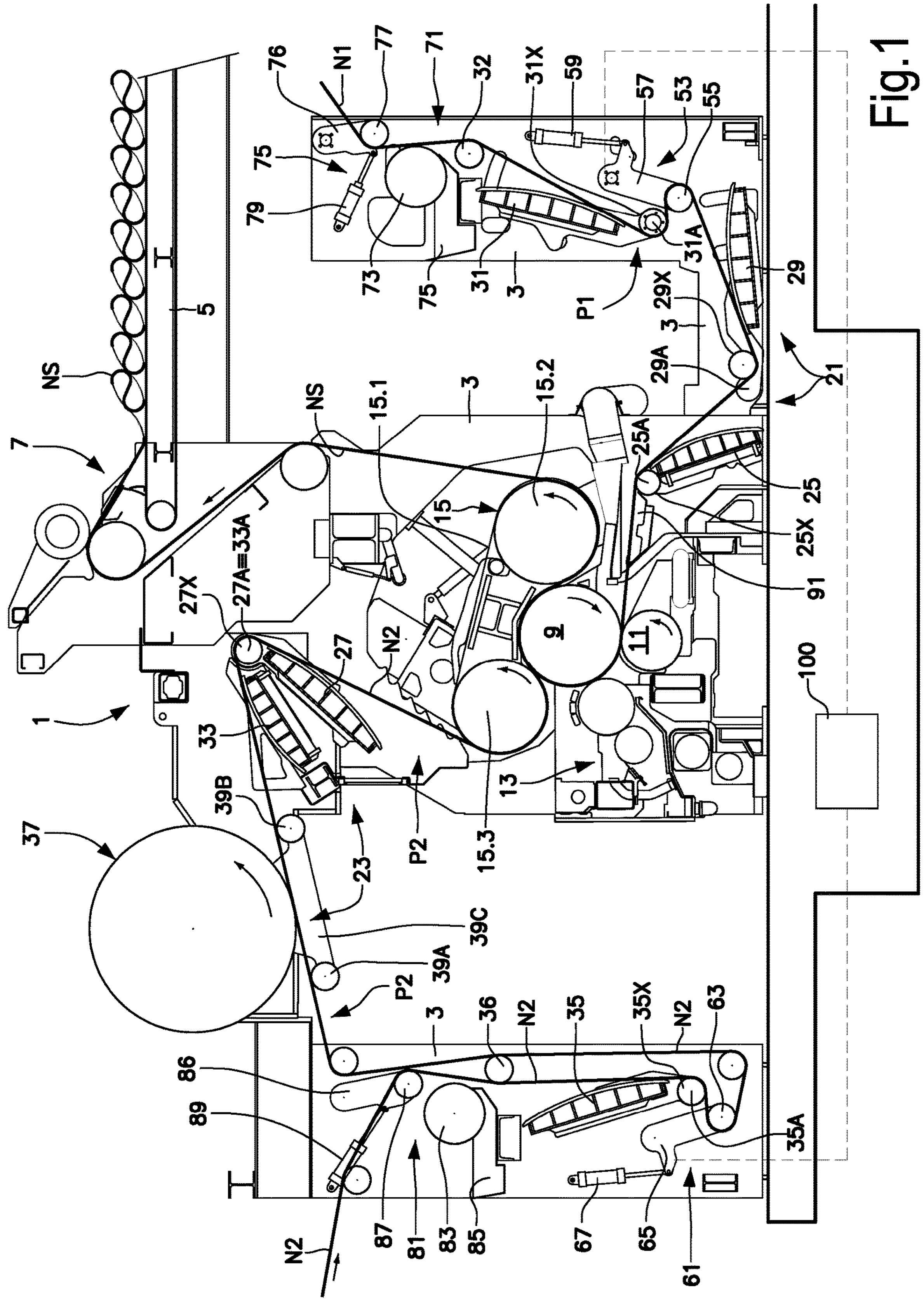
FIG. 1 is a schematic side view of a single facer in a first embodiment, with the preheating devices in idle position.

FIGS. 1, 2, 3, 4, and 5 show a first embodiment of the single facer 1.

The single facer 1 comprises a bearing structure 3 connected to a bridge 5, along which a single face corrugated board, produced by the single facer 1, is fed.

The single facer 1 comprises a first feed path P1 to feed a first paper web N1 coming from a first unwinder, not shown. The single facer 1 also comprises a second feed path P2 to feed a second paper web N2 coming from a second unwinder, not shown. The first paper web N1 forms the fluting of the single face corrugated board NS exiting from the single facer 1, whilst the second paper sheet N2 forms the liner of the single face corrugated board NS. Through a lifting device 7, the single face corrugated board NS, produced by the single facer 1, is fed to the bridge 5, and from here it is fed to a double facer, in order to be glued to other webs of single face corrugated board coming from other single facers, and/or to a second liner, to form a corrugated board with one or more flutes. In other embodiments, the web of single face corrugated board is directly cut into sheets or wound in rolls.

The single facer 1 comprises a first corrugating roller 9 and a second corrugating roller 11, co-acting together to form a corrugating nip, through which the first paper web N1 is fed so as to be permanently deformed, i.e., fluted. The feed path P1 extends through the corrugating nip between the corrugating rollers 9 and 11 and between the corrugating roller 9 and a glue dispenser 13, which is adapted to apply glue to the crests of the flutes formed on the first paper web N1. The glue dispenser 13 is arranged adjacent to the first corrugating roller 9, downstream of the corrugating nip in the feed direction of the paper web N1, and co-acts with the first corrugating roller 9. More precisely, the glue dispenser 13 is arranged between the corrugating nip, defined by the corrugating rollers 9 and 11, and a pressure member 15, co-acting with the first corrugating roller 9 and defining, with this latter, a pressure nip to glue the two paper webs N1, N2 together.

Figure 2:
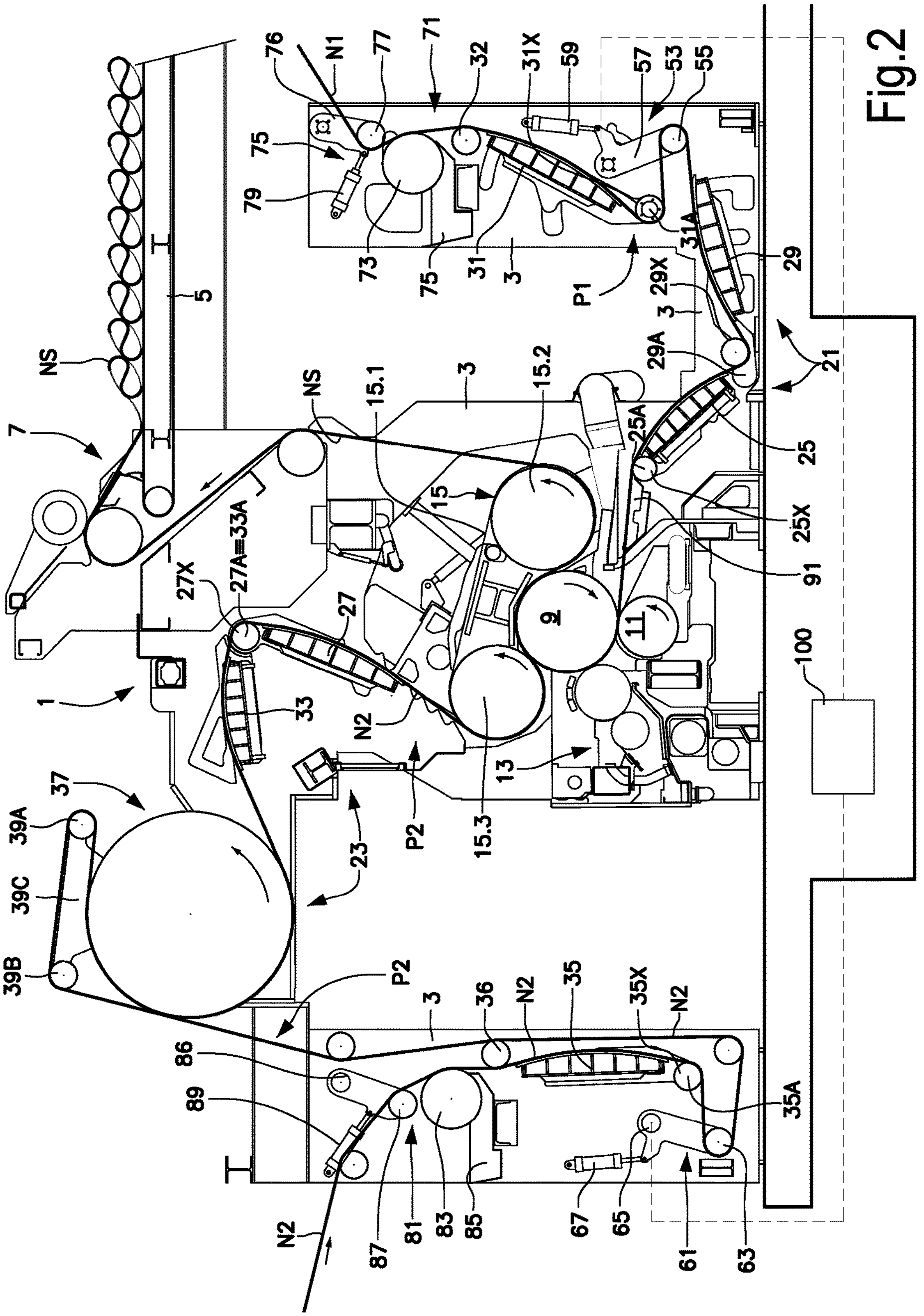
FIG. 2 is a side view analogous to that of FIG. 1, with the preheating devices in active position.

In the embodiment of FIGS. 1 and 2, the pressure member 15 comprises a continuous flexible member 15.1 driven around two guide rollers 15.2 and 15.3. Actuating members press the continuous flexible member 15.1 against the cylindrical surface of the first corrugating roller 9.

The second feed path P2 extends through the pressure nip, between the pressure member 15 and the first corrugating roller 9, so that the first paper web N1 and the second paper web N2 are bonded together while moving through the first corrugating roller 9 and the pressure member 15, thanks to the glue applied by the glue dispenser 13. Gluing is performed through pressure and heat applied to the paper webs N1, N2. To this end, the paper webs N1, N2 are preheated before being fed to the corrugating rollers 9, 11. Moreover, also the corrugating rollers 9 and 11 may be heated, so as to transfer heat to the paper webs N1, N2. The corrugating rollers may be heated, for example, through saturated or superheated steam flowing inside the corrugating rollers 9, 11.

A first heating system 21 is arranged along the first feed path P1 to preheat the first paper web N1 before it arrives to the corrugating rollers 9 and 11. Analogously, a second heating system 23 is arranged along the second feed path P2 to preheat the second paper web N2 before it arrives to the first corrugating roller 9 and the pressure member 15.

As it will be better described below, each heating systems 21, 23 comprises at least one stationary heating plate, and preferably two stationary heating plates, on which the respective paper web N1 or N2 moves. "Stationary plate" means a plate that is substantially stationary during operation (in contrast to a preheating roller, that rotates at the same feed speed of the paper web). As better explained below, each heating plate is provided with an adjustment movement to modify the arc of contact with the respective paper web N1, N2.

More in particular, the first heating system 21 comprises a first heating plate and a second heating plate 29. The second heating system 23 comprises a third heating plate 27 and a fourth heating plate 33.

In the illustrated embodiment, the first heating system 21 also comprises a fifth heating plate 31, and the second heating system 23 also comprises a sixth heating plate 35.

In the present description and the attached claims, if not otherwise indicated the adjective "first", "second", "third" etc. have the sole function of uniquely identifying the single heating plates and are not limiting, for example they do not limit the overall number of heating plates provided in each feed path nor the reciprocal position of the heating plates. For example, the heating plate 31 of the first heating system 21 is indicated as "fifth" heating plate, to distinguish it from the remaining heating plates 25, 27, 29, 33, 35; but this does not necessarily imply that the single facer comprises five (or more) heating plates.

In some embodiments, the second heating system 23 arranged along the second feed path P2 also comprises a heating roller 37.

In general, even if in FIGS. 1 and 2 three heating plates are provided for each eating system 21 and 23, in other embodiments the number of heating plates provided for each heating system (and therefore for each feed path P1 and P2) may be different from that illustrated and it is also possible to provide a number of heating plates different for each of the two feed paths P1, P2.

Currently, the preferred configuration of the first heating system 21 is that illustrated, with the three heating plates 25, 29, 31, and the preferred configuration of the second heating system 23 is that illustrated, with the three heating plates 27, 33, 35.

The minimal configuration provides for two heating plates in each feed path P1, P2. In this case, the plates may be arranged so as to touch respectively a first face and a second face of the respective paper web N1, N2. However, this is not strictly necessary.

In the example of FIGS. 1 and, 2 what above applies to the feed path P1, whilst in the feed path P2 all heating plates are arranged to heat the same face of the paper web N2. The heating roller 37 is provided to heat the opposite face.

In some embodiments, two heating plates are provided along each feed path, which touch the face of the respective paper web N1, N2 that is in contact with the glue applied by the glue dispenser 13. Therefore, in the first feed path P1 of the first paper web N1 only the two heating plates 25 and 29 are provided, heating the face of the paper web N1 that, in the corrugating nip between the first corrugating roller 9 and the second corrugating roller 11, faces the second corrugating roller 11.

Along the second feed path P2 of the second paper web N2 only the two heating plates 27 and 33 are provided, heating the face of the paper web N2 that faces the first corrugating roller 9. If provided (as in FIGS. 1 and 2), the third plate of each path, or of one path, heats the opposite face of the respective paper web N1, N2.

In some embodiments, the heating roller 37 is replaced by a heating plate and/or the heating plate 35 is omitted.

In advantageous embodiments, each heating element 25, 27, 29, 31, 33, 35, 37 comprises adjusting members for adjusting the arc of contact between the respective paper web N1 or N2 and the heating element.

In the embodiment of FIGS. 1 and 2, the heating roller 37 comprises a contact arc adjusting member comprising one or two guide rollers 39A, 39B carried by arms 39C pivoting around the rotation axis of the heating roller 37. As it can be clearly understood by comparing FIGS. 1 and 2, by changing the angular position of the arms 39C carrying the guide rollers 39A, 39B around the rotation axis of the heating roller 37 it is possible to change the arc of contact between the second paper web N2 and the outer cylindrical surface of the heating roller 37, thus heating more, or heating less, the second paper web N2. In FIG. 1 the arc of contact between heating roller 37 and paper web N2 is practically null (no heating).

Each heating plate 25, 27, 29, 31, 33, 35 comprises a respective preferably cylindrical curved active surface (in advantageous embodiments a round cylindrical surface), on which the respective paper web N1 or N2 moves (when the plate is in active position).

Advantageously, each heating plate 25, 27, 29, 31, 33, 35 is mounted on the bearing structure 3 so as to rotate around an adjustment axis, in order to adjust the angular position of the heating plate. The adjustment axis is substantially horizontal and orthogonal to the feed direction of the first paper web N1 and of the second paper web N2. The adjustment axis of each heating plate is substantially parallel to the generating lines of the cylindrical active surface of the respective heating plate. In the drawing, the adjustment axes of the heating plates 25, 27, 29, 31, 33, 35 are indicated with the reference number of the respective heating plate followed by the letter "A". For example, the adjustment axis of the heating plate 25 is indicated with 25A. In the illustrated embodiment, the rotation axes 27A, 33A of the heating plates 27 and 33 coincide.

The rotation of each heating plate is controlled by a respective actuating device, comprising for example a linear actuator, or preferably a pair of linear actuators, one on each side of the single facer 1, for example a pair of pneumatic or preferably hydraulic cylinder-piston actuators. The actuating device may alternatively comprise mechanical jacks or even linear or rotary electric motors.

Rotation can be controlled continuously within a given angle, between two end positions, for example a position where the arc of contact between the active surface of the heating plate and the paper web is substantially null, and a position where the arc of contact between the active surface of the heating plate and the paper web is to maximum.

In case hydraulic actuators are used, these may be provided with proportioning valves on the pressure fluid supply line, for greater precision in adjusting the angular position of each heating plate.

The angular position of one, some or all heating plates may be detected by a sensor or an encoder. In some embodiments, temperature sensors are provided at one or more points of the feed path of the first and/or the second paper web N1, N2. The angular position of one or more heating plates is adjusted based on the temperature detected by the one or more temperature sensors. For example, a temperature sensor may be provided between the furthest downstream heating plate and the first corrugating roller 9, to detect the temperature of the respective paper web immediately before the web directly or indirectly contacts the first corrugating roller 9, and to compare the detected value with a preset value. In further embodiments, for adjusting each heating plate in an independent and more accurate manner, a temperature sensor is provided downstream of each heating plate, that detects the temperature and gives a value to be compared with a temperature value required downstream of the respective heating plate.

In simpler embodiments, the temperature sensors may be omitted and the position of the heating plate(s) is detected through preset curves that have been experimentally calculated based on the feed speed of the paper webs.

Just by way of non-limiting example, in FIG. 1 all heating plates 25, 26, 29, 31, 33, 35 are rotated in such a position that the arc of contact between the respective paper web N1, N2 and the active surface of the heating plate is minimal, whilst in FIG. 2 all heating plates are in a position where the arc of contact with the respective paper web N1, N2 is maximal. However, it should be understood that the angular position of each heating plate can be adjusted independently of the angular position of the other heating plates, with the exception of the heating plates 27, 33 that, in this embodiment, move in coordinate manner with respect to each other, as it will be better explained below. Practically, each heating plate may be advantageously arranged in an angular position independent of that of the other heating plates, based on the operating conditions of the single facer 1. To this end, each heating plate 25, 29, 31, 35 may have an own independent actuating device. On the contrary, the plates 27, 35 in the illustrated embodiment have a common actuating device, as described below.

Figure 3:
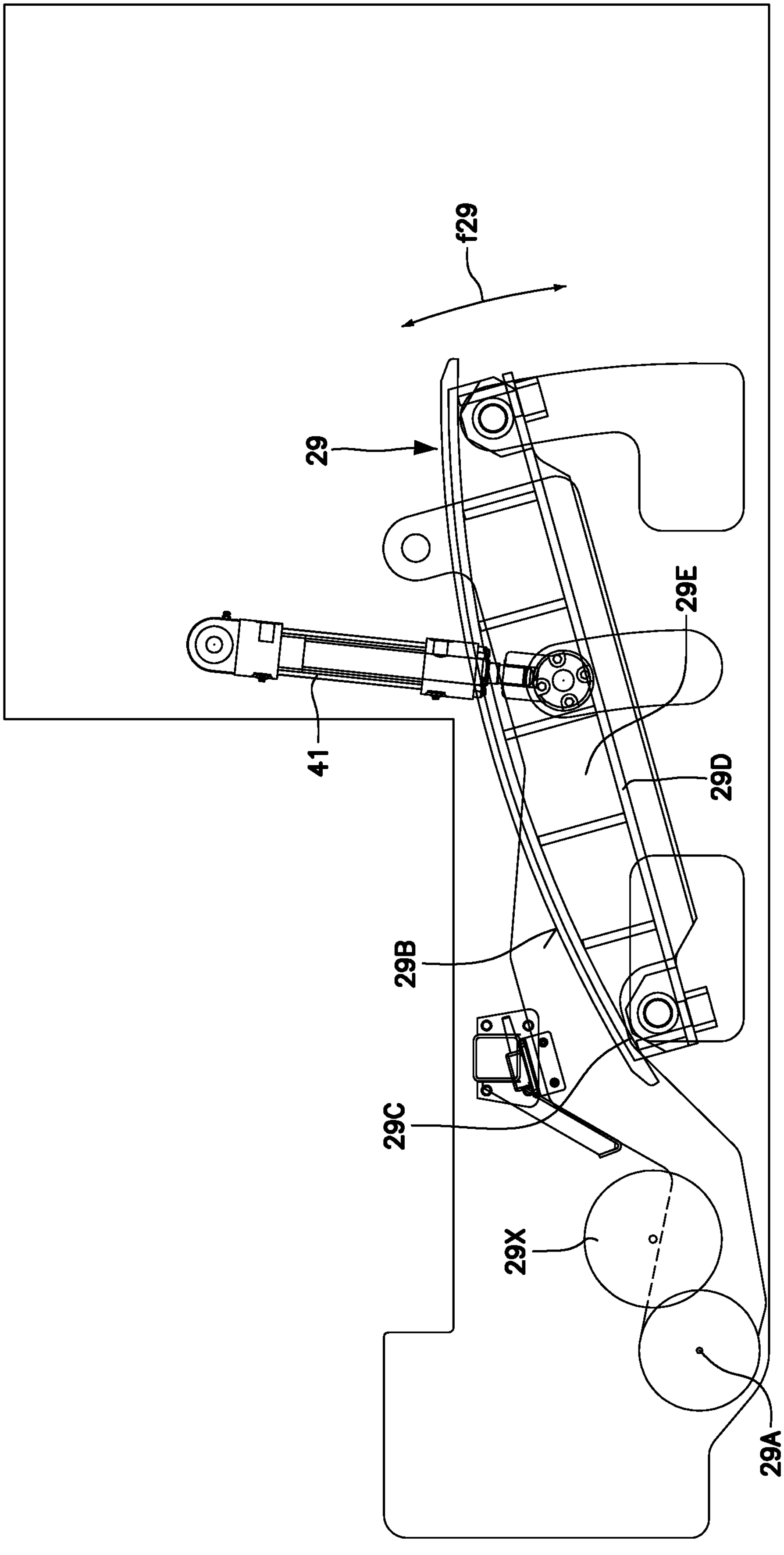
FIG. 3 shows a detail of a mechanism for actuating one of the heating plates.

Just by way of example, in FIG. 3 the third heating plate 29 is shown in greater detail, with a cylinder-piston actuator (or preferably an actuating device with two cylinder-piston actuators) controlling the rotation movement of the third heating plate 29 around the adjustment axis 29A according to double arrow f29. In FIG. 3 reference number 29B indicates the active surface of the heating plate 29, constituted by a portion of circular cylinder with generating lines parallel to the adjustment axis 29A.

The heating plates 25, 31, 35 are configured similarly to the heating plate 29, each with a respective actuating device, for example a pair of linear actuators (an actuator on each side of the single facer) in order to change and to register the angular position of the respective heating plate.

Each heating plate comprises an inner chamber, in which a heat-transferring fluid flows and which is delimited by a wall defining the curved active surface, and by an opposite closing wall that can be flat. In FIG. 3, the wall forming the curved active surface 29B is indicated with reference number 29C and the opposite wall is indicated with 29D. Reference number 29E indicates the inner chamber of the heating plate 29 where the heat-transferring fluid, typically steam, flows.

As can be understood from FIGS. 1 and 2, in advantageous embodiments the heating plates are positioned inclined with respect to the horizontal, so as to have an end area of the inner chamber arranged at lower height than the remaining part of the inner chamber. In this way, an area is defined for each heating plate for collecting the condensate formed due to the transfer of latent vaporization heat from the steam to the respective paper web N1 or N2 through the wall defining the active surface of the heating plate. In this way, the inner surface of the wall defining the curved active surface, on which the paper web N1 or N2 moves, and through which heat is transferred to the paper web, is free from condensate that could hinder or reduce heat transfer. In the condensate collection area, members may be provided for removing condensate, for example discharge pipes.

As mentioned above, the heating plates 27 and 33 are mounted pivoting around a common adjustment axis indicated with 27A, 33A. The rotation of the heating plates 27, 33 is controlled by a common actuating device. This common actuating device can comprise a pair of cylinder-piston actuators, as in the case of the remaining heating plates.

Figure 4:
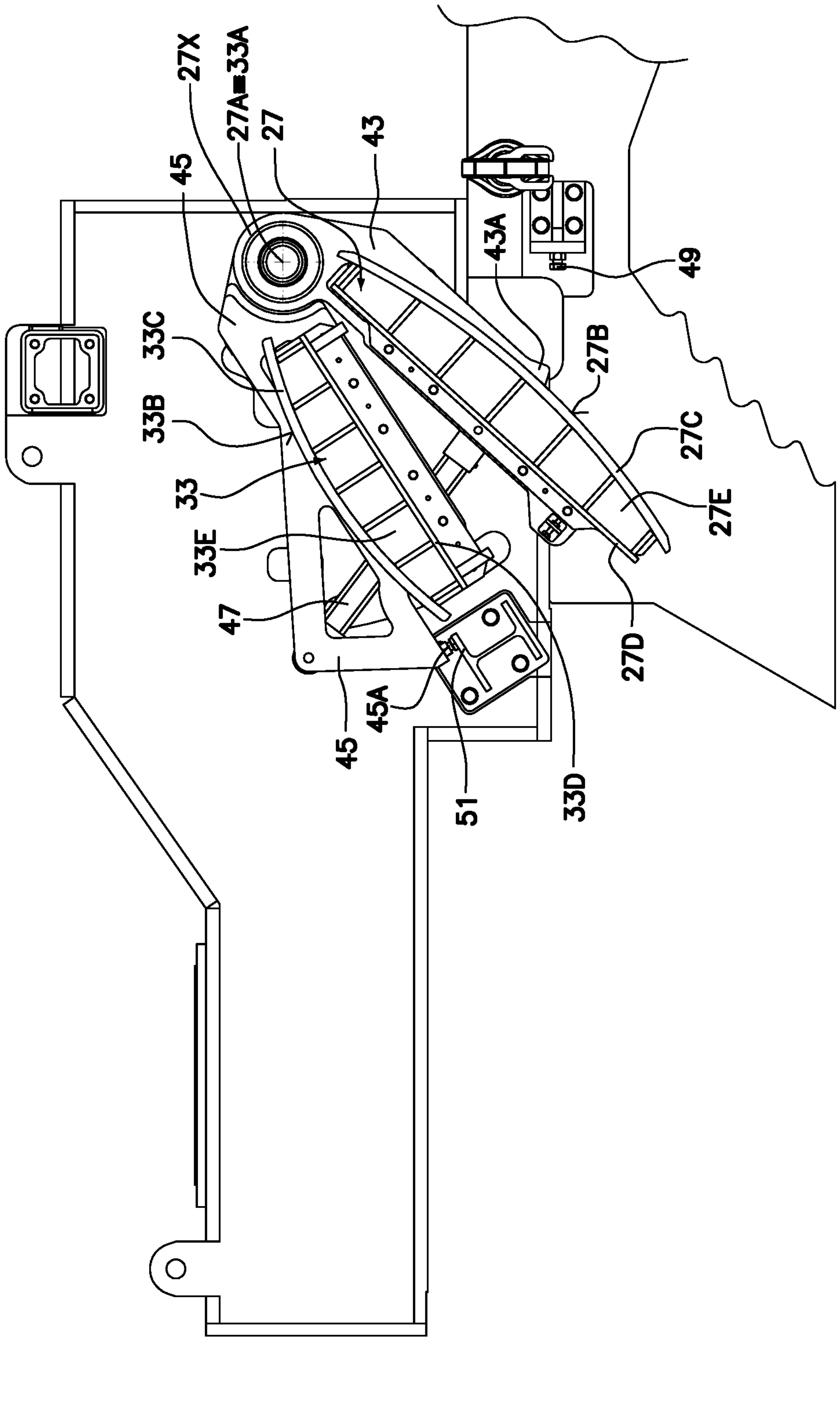
FIG. 4 is an enlarged cross-section, according to a vertical plane, of a pair of heating plates arranged along the feed path of the second paper web.
Figure 5:
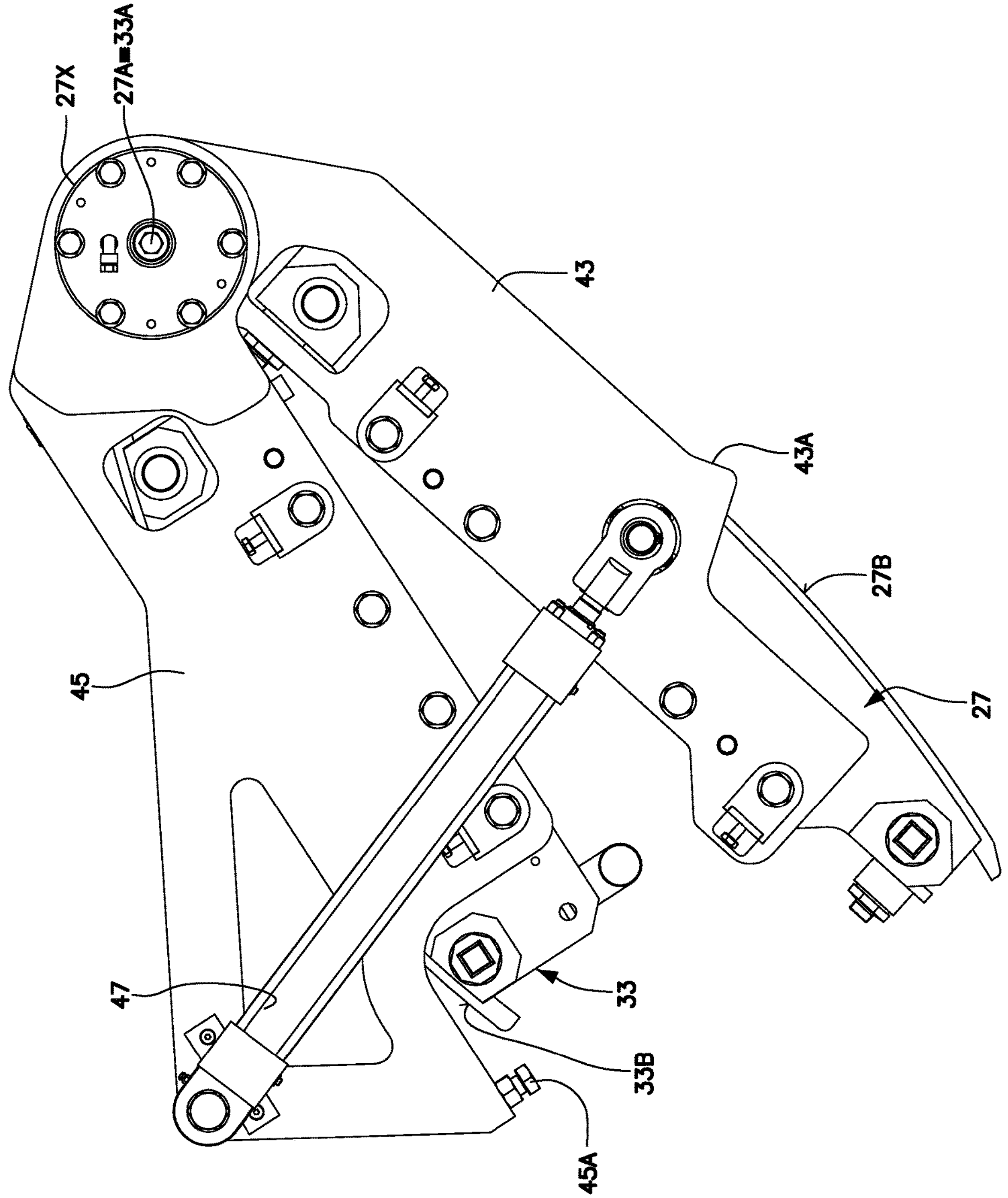
FIG. 5 is a side view of the pair of heating plates with the respective mechanism for controlling the adjustment movement for adjusting the arc of contact between heating plates and paper web.

The structure bearing and moving the two heating plates 27, 33 is illustrated in greater detail in FIGS. 4 and 5. More in particular, FIG. 4 shows a cross-section according to a vertical plane intermediate between the two sides of the single facer. Reference numbers 27B and 33B indicate the cylindrical active surfaces of the heating plates 27, 33, on which the paper web N2 moves. Reference numbers 27C and 33C indicate the walls respectively forming the surfaces 27B, 33B. Reference numbers 27D and 33D indicate the walls opposite the walls 27C, 33C. Reference numbers 27E, 33E indicate the chambers where the heat-transferring fluid (for instance steam) flows.

Referring again to FIG. 4, the heating plate 27 is fastened to two arms 43, only one of which is shown in the cross-section of FIG. 4, arranged along a side of the single facer 1. The other arm is arranged close to the opposite side of the single facer and is symmetrical to the arm 43 shown in the figure with respect to a median vertical plane. The two arms 43 are hinged around the axis 27A, 33A and are integral with the heating plate 27, which is supported by and between the arms 43. Similarly, the heating plate 33 is fastened to two arms 45, only one of which is shown in the cross-section of FIG. 4, arranged along a side of the single facer 1. The other arm is arranged close to the opposite side of the single facer. The two arms 45 are hinged around the axis 27A, 33A and are integral with the heating plate 33, which is supported by and between the arms 45.

Each arm 43 is connected to the corresponding arm 45 by means of an actuator, for example a linear cylinder-piston actuator 47, which is arranged outside the respective arms, i.e. on the side of the arms opposite the heating plates 27, 33. The set of the two actuators 47 forms the actuating device for adjusting the angular position of the two heating plates 27, 33. Lengthening and shortening of the actuators 47 cause the scissor opening and closing of the arms 43, 45 and therefore the change of the angular position of the two heating plates 27, 33.

FIG. 5 shows an outer view of the unit formed by the heating plates 27, 33 and the respective arms 43, 45 supporting them. In FIG. 5 one of the two cylinder-piston actuators 47 is shown.

In practical embodiments, the arrangement is such that, starting from a closing position of the arms 43, 45, as shown in FIGS. 1 and 4, the lengthening of the actuators 47 initially causes a lowering, i.e. a counterclockwise rotation in the drawing, of the heating plate 27 until to achieve a maximum opening position. This position is defined by abutment members 49 integral with the bearing structure 3 of the single facer 1. Each arm 43 touches the respective abutment members 49 for example in correspondence of a surface 43A. In the position illustrated in the figure, the arms 45 rest on respective abutment members 51 integral with the bearing structure 3. Each arm 45 is provided with a stop element 45A co-acting with the abutment members 51.

Once the arms 43 and the plate 27 have achieved the maximum opening position, the further lengthening of the actuators 47 causes the lifting, i.e., the clockwise rotation in the drawing (i.e., opposite to the initial rotation of the heating plate 27), of the heating plate 33, up to the maximal extension of the actuators 47, corresponding to the position where the arms 43, 45 and the heating plates 27, 33 are moved away from each other as much as possible. In the maximum opening position, the arc of contact between the paper web N2 and the heating plates 27, 33 is maximal.

During the closing step, the movement of the heating plates 27 and 33 is reverse to what described: firstly the heating plate 33 rotates counterclockwise, then the heating plate 27 rotates clockwise, with a consequent gradual decrease of the overall contact surface between paper web N2 and heating plates 33, 27.

In advantageous embodiments, a tension regulator is provided in one or both paths P1, P2. The tension regulator is preferably arranged between two adjacent heating plates.

In the embodiment of FIGS. 1 and 2, a first tension regulator 53 is provided in the feed path P1. In the illustrated embodiment, the tension regulator 53 is arranged between the heating plate 31 and the heating plate 29. In some embodiments, the tension regulator 53 comprises a take-up roller 55, around which the paper web N1 is driven. The take-up roller 55 is supported by a pair of arms 57 hinged to the bearing structure 3 and co-acting with a return member, for example a pneumatic spring 59, or with a pair of return members, one for each side.

In the embodiment of FIGS. 1 and 2, a tension regulator 61 is also provided, arranged along the second feed path P2. In this embodiment, the tension regulator 61 is arranged between the heating plate 35 and the heating plate 33. Analogously to the tension regulator 53, in some embodiments the tension regulator 61 comprises a take-up roller 63, around which the paper web N2 is driven. The take-up roller 63 is supported by a pair of arms 65 hinged to the bearing structure 3 and co-acting with a return member, for example a pneumatic spring 67, or with a pair of return members, one for each side.

Whilst in the illustrated embodiment the take-up rollers are supported by pivoting arms, in other embodiments they can be provided with a translation movement, instead of a pivoting movement around an axis. In that case, the take-up roller can be carried by slides movable on low-friction guides.

The tension regulator, combined with a heating system with heating plates, is particularly advantageous as it allows to balance friction variations resulting either from changes in the arc of contact between paper web N1 or N2 and heating plates, or from other factors. In fact, by changing the angular position of a heating plate, the friction exerted onto the paper web by the heating plate changes quickly and also the tension of the paper web consequently changes. The tension regulator allows to limit these changes also while the heating plates move. Tension variations in the paper web, which can be balanced by the tension regulator, can be also caused by other factors, such as change in the feed speed of the paper web, or by the effect of liquid dispensers, described below.

Practically, an encoder may be associated with each take-up roller of the tension regulators, which identifies the position of the respective support arms 57 *e* 65 and, therefore, of each take-up roller 55, 63. The signal from the encoder is transmitted to a central control unit (schematically indicated with reference number 100 in FIGS. 1 and 2). The central control unit can be so programmed to modify the feed speed or the tension of the paper web N1 or N2 depending on the position of the respective take-up roller, with a control loop that tends to keep the take-up roller around a preset position.

In this way, if for example a change in the arc of contact between paper web and heating plate tends to increase the paper web tension, the take-up roller moves in such a direction to reduce this tension increase. The change in the position of the take-up roller, detected by the respective encoder, causes such a change in the feed speed of the paper web (if necessary, by modifying the tension) to eliminate the displacement of the take-up roller. The tension change can be caused by a change in the arc or contact between paper web and heating plate upstream of the take-up roller. Typically, if the arc of contact between paper web and heating plate increases, the tension detected by the roller also increases. The opposite condition occurs in case of reduction in the arc of contact between paper web and heating plate.

In some embodiments, liquid dispensers are provided along one or both the first feed path P1 and the second feed path P2, that are adapted to apply a liquid to one of the two opposite faces of the respective paper web N1, N2. In particular, the liquid may be water.

In the embodiment of FIGS. 1 and 2, a first liquid applying device 71 is arranged in the first feed path P1 upstream of the heating plate 31. In advantageous embodiments, the first liquid applying device 71 is arranged directly upstream of the heating plate 31, i.e., with no further members of contact with the paper web arranged between the water dispenser 71 and the heating plate 31, with the only exception of a guide roller 32, if necessary.

In advantageous embodiments, the first liquid applying device 71 is so arranged as to apply liquid to the face of the first paper web N1 that goes into contact with the first heating plate met by the paper web N1 after having received the liquid applied by the liquid applying device 71, i.e. the heating plate 31 in the example of FIGS. 1 and 2. In this way, when the paper web N1 touches the heating plate 31, water, or other liquid, applied to the surface thereof facing the heating plate 31 evaporates, thus protecting paper from a too quick heating, and penetrating in the form of steam into the cellulose fibers forming the paper web N1, thus making it ready to receive glue.

In some embodiments, the liquid applying device 71 is a so-called bar coater or rod coater, comprising a fountain roller 73 rotating around a horizontal axis, i.e., an axis orthogonal to the feed direction of the paper web N1, coated with a helical wire forming a surface for receiving the liquid and transferring it to the face of the paper web N1 touching the fountain roller 73. The fountain roller 73 takes the liquid from a fountain 75 below. The fountain roller 73 may be motorized and rotate at adjustable peripheral speed greater than, lower than, or equal to the feed speed of the first paper web N1. The peripheral speed of the fountain roller 73 is so modulated as to dose adequately the quantity of water, or other liquid, applied to the face of the paper web N1.

By changing the peripheral speed of the fountain roller 73 and setting it to a value different than the feed speed of the respective paper web N1, variations in the tension of the paper web N1 can occur. The use of the tension regulator 53 allows to balance these tension variations, tending to keep the tension of the paper web N1 around a preset value.

In some embodiments, the liquid applying device 71 may comprise a guide member 75 adapted to guide the paper web N1 so that it is selectively in contact with the fountain roller 73 or spaced from it, to receive or not liquid, based on the operating needs. In the illustrated embodiment, the guide member comprises a guide roller 77 carried by movable arms 76 and controlled by an actuator 79. In this way, the liquid application may be omitted, if required.

In the embodiment of FIGS. 1 and 2, a second liquid applying device 81 is arranged along the second feed path P2 upstream of the heating plate 35. In advantageous embodiments, the second liquid applying device 81 is arranged directly upstream of the heating plate 35.

In advantageous embodiments, the second liquid applying device 81 is so arranged as to apply the liquid to the face of the second paper web N2 that goes into contact with the first heating plate met by the paper web N2 after having received the liquid, i.e., the heating plate 35 in the example of FIGS. 1 and 2, for the same reasons already described above with reference to the first liquid applying device 71.

In some embodiments, also the liquid applying device 81, similarly to the applying device 71, is a bar coater comprising a fountain roller 83 rotating around a horizontal axis, i.e. an axis orthogonal to the feed direction of the paper web N2, that takes the liquid from a fountain 85 below. The fountain roller 83 may be motorized and the rotation speed may be controlled in the same manner as described for the fountain roller 73.

In some embodiments, the liquid applying device 81 may comprise a guide member adapted to guide the paper web N2 so that it is selectively in contact with the fountain roller 83 or spaced from it, to receive or not the liquid. In the illustrated embodiment, the guide member comprises a guide roller 87 carried by movable arms 86 and controlled by an actuator 89.

In some embodiments, any one or both the liquid applying devices 71, 81 are omitted, in order to simplify the structure of the single facer 1. In case only one liquid applying device is provided, this is preferably the applying device 81 that applies liquid to the paper web N2 intended to form the liner (flat sheet) of the single face corrugated board NS.

The use of the liquid applying device 71 allows some advantages as regards preparation of the paper web N1 to be glued. As mentioned above, when the paper web N1, that has received the layer of liquid (typically water) on its surface, goes into contact with the heating plate 31 downstream of the liquid applying device 71, the applied water evaporates, thus forming a steam film between the heating plate 31 and the paper web N1. This steam film protects the paper from too quick or too high heating and opens the paper pores, thus facilitating the following absorption of glue. In this way, the amount of glue applied by the glue dispenser 13 may be reduced, with consequent savings in term of material and thermal energy.

In fact, the glued used in these application is typically a starch- and water-based glue, wherein water constitutes the transferring fluid to make the penetration of starch into the cellulose fibers of the paper web easier. If steam has been applied to the paper web N1 in the feed path P1 upstream of the corrugating rollers 9, 11, the amount of glue can be reduced. To a lower amount of applied glue corresponds a lower amount of energy required for the reciprocal adhesion of the paper webs N1, N2, as well as a lower glue consumption.

In the illustrated embodiment, water is applied to the face of the paper web N1 opposite the face on which glue is applied. The reason thereof is that the feed path of the paper web N1 is such to make the application of water to that surface easier. Usually, the paper web N1 is thin; therefore, steam penetrates through it causing dilation of paper pores also on the face opposite to that where water is applied. However, it is also possible to apply water (only or also) to the opposite face, i.e. the face to which glue is then applied.

The application of water to the paper web N2 forming the liner of the single face corrugated board NS has analogous advantages in terms of facilitating gluing and reducing the amount of glue and, consequently, energy consumption. Water is preferably applied to the face intended to contact the crests of the paper web N1, because the feed path P2 allows it smoothly and also because the paper web N2 usually has a thickness greater than the thickness of the paper web N1.

Applying water to the paper web N2 has also further advantages. In particular, applying water to the paper web N2 increases dimensional stability of the paper web during the subsequent steps of gluing, cutting into sheets and stacking, thus reducing the risk for the sheets formed by the corrugated board to warp.

In addition to the advantages in terms of material and energy consumption, reducing the amount of applied glue also allows to reduce the drawbacks connected with the dispersion of glue caused by centrifugal force once the glue has been applied to the crests of the corrugated paper web N1. This is advantageous because reduces the accumulation of glue residues on the mechanical members of the single facer.

With any one or both the liquid applying devices 71, 81, humidity sensors may be associated, adapted to measure the water percentage in the respective paper web N1, N2. Some known humidity sensors are able to determine the water percentage in, or on, the paper web, whether humidity is absorbed in the cellulose structure or is partially or completely distributed on the outer surface in the form of a liquid film. In this way, it is possible to adjust the amount of liquid supplied by the respective liquid applying device so as to keep the humidity content of the paper web approximately at a preset value.

In some embodiments, along the first feed path P1 a humidifier can be provided, comprising for example a box, from which steam is supplied to the first paper web N1. In FIGS. 1 and 2, a humidifier 91 is schematically shown, i.e., a steam supplying device that can be advantageously provided between the heating plate 25, i.e., the heating plate furthest downstream along the first feed path P1, and the nip between the first corrugating roller 9 and the second corrugating roller 11.

The humidifier 91 can comprise for example a box, to which steam is supplied and which has a sliding surface for the paper web N2, which is defined by a wall having openings for supplying steam towards the paper web N1 moving along the sliding surface.

Figure 6:
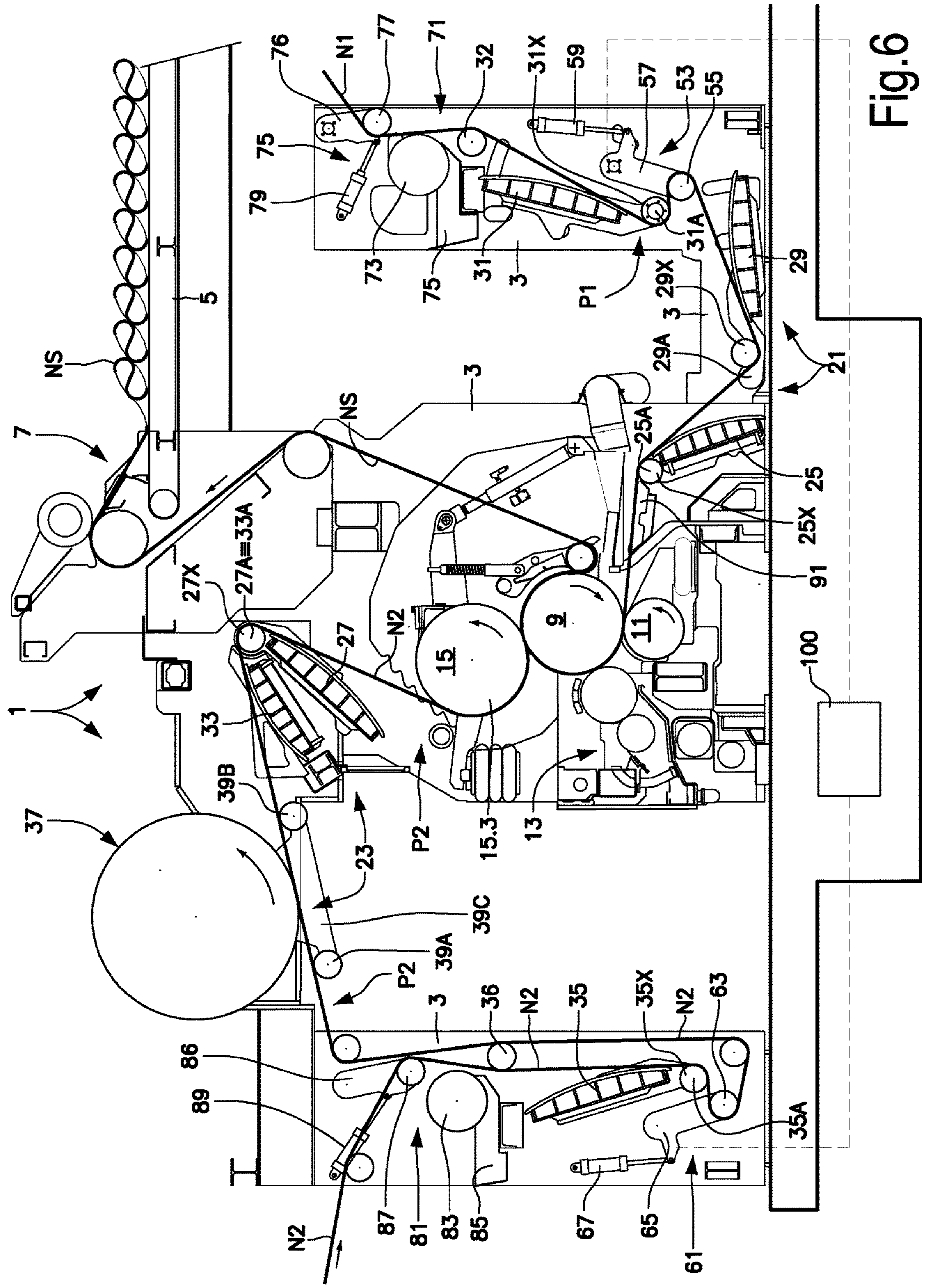
FIGS. 6 and 7 show side views, analogous to those of FIGS. 1 and 2, in a different embodiment of the single facer.
Figure 7:
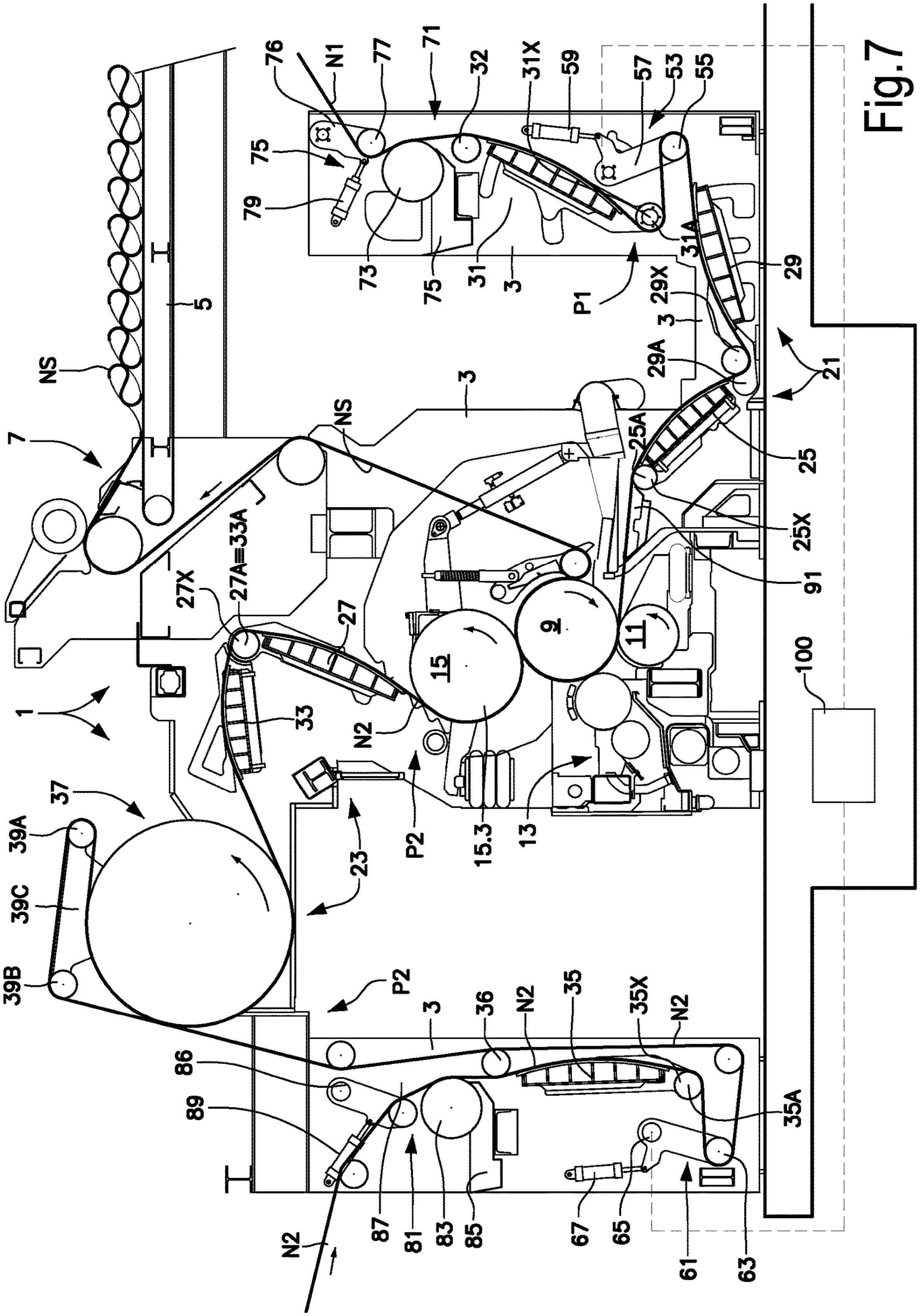

FIGS. 6 and 7 show views, similar to those of FIGS. 1 and 2, of a different embodiment of the single facer 1. The same reference numbers indicate the same or equivalent parts to those described with reference to FIGS. 1 and 2, and therefore they will be not described again. The main difference between the embodiment of FIGS. 6 and 7 and that of FIGS. 1 and 2 consists in the different configuration of the pressure member 15, that in FIGS. 6 and 7 is constituted by a pressure roller instead of a flexible member.

The use of movable heating plates to change the arc of contact between paper web and heating surface allows to solve many technical problems typical of the roller heating systems. In particular, those problems are reduced, resulting from condensate accumulation on the inner surface of the heat exchange wall, that in the rollers is caused by the centrifugal force.

Moreover, by using the movement of the heating plates to change the arc of contact between paper web and heating surface, it is possible to have changes of the arc of contact quicker than those obtained with roller preheating systems or with preheating systems utilizing heating plates that use movable deviating rollers to change the arc or contact between heating plate and paper web.

To this end, as shown in FIGS. 1 and 2, each feed path P1, P2 comprises guide rollers that are arranged such that the shape of the feed path, the position of the individual heating plates and the radius of the heating surfaces thereof (active surfaces on which the paper web moves) are such that a small rotation of the heating plate around the adjustment axis causes a large change in the arc of contact. This can be obtained, for example, by arranging the adjustment axis near one of the two ends of the heating plate and by defining such a feed path P1, P2 of the respective paper web N1, N2 that, when the arc of contact is minimal, the paper web is nearly tangent to the respective heating plate near the end of the plate where the adjustment axis is provided. In this way, by slightly rotating the heating plate around the adjustment axis, the arc of contact increases very quickly until to cover the entire extension of the active surface, i.e., of the heat exchange surface of the heating plate, along which the paper web moves.

As shown in the embodiment of FIGS. 1 and 2, these features of the feed path can be obtained by providing, for each heating plate, a guide roller nearly coaxial with the adjustment axis and a guide roller upstream or downstream (with respect to the paper web feed direction) of the end of the respective heating plate opposite the adjustment axis. In other cases, the guide roller, instead of being coaxial with the adjustment axis of the heating plate, is close to the end of the heating plate in correspondence of which the adjustment axis is provided, and farthest from the opposite end of the heating plate, i.e. the distal end with respect to the adjustment axis.

For example, the shape of the feed path P1 in the area of the heating plate 31 is defined by a guide roller 31X coaxial with the adjustment axis 31A and by a guide roller 32 upstream (with respect to the feed direction of the paper web N1) of the heating plate 31. For the heating plate 29, the path of the paper web N1 is defined by a guide roller 29X adjacent to the adjustment axis 29A and by the take-up roller 55. The guide roller 29X, together with a guide roller 25X coaxial with the axis 25A, defines the segment of feed path adjacent to the heating plate 25.

For the pair of heating plates 27, 33, a common guide roller 27X is provided, coaxial with the adjustment axis 27A coinciding with the adjustment axis 33A. The segment of feed path associated with the heating plate 27 is defined between the guide roller 27X and the roller 15.3 of the pressure member 15 (FIG. 1, 2) or the pressure roller 15 (FIG. 6, 7), which, in this case, has also the function of guide roller for the paper web N2. The segment of feed path associated with the heating plate 33 is defined between the guide roller 27X and the roller 39B (FIG. 1) or the heating roller 37 (FIG. 2), depending on the angular position of the guide roller 39B with respect to the heating roller 37. Lastly, the path of the paper web N2 associated with the heating plate 35 is defined between a guide roller 35X coaxial with the adjustment axis 35A and a guide roller 36.

In addition to allowing a quicker adjustment of the surface of contact between the paper web and the heating members, the use of heating plates instead of heating rollers also reduces the overall number of guide rollers along the paper web feed paths. This is advantageous from many viewpoints. Firstly, the overall structure of the single facer is simplified. Moreover, as part of the heat supplied to the paper web is subsequently removed by the guide rollers, by reducing the number thereof the heat loss decreases and the overall thermal efficiency of the single facer increases.

Moreover, the guide rollers are not motorized and have high inertia (high moment of inertia). Therefore, they cause significant tension variations in the paper web when changes in the paper web feed speed occur. This problem is mitigated by reducing the number of guide rollers.

The use of heating plates limits the formation of wrinkles in the paper webs N1, N2 thanks to the effect of friction between webs and plates. Wrinkle reduction may be also improved by machining the cylindrical surfaces of contact between paper web and heating plate, for example by providing small reliefs or grooves arranged symmetrically with respect to the centerline of the plate and inclined towards the side ends of the plate, that tend to stretch transversally the paper web sliding moving on the heat exchange surface of the heating plate. In this way the heating plate has also the function of stretcher of the paper web.

At least some of the advantages of the embodiments described above may be also obtained through simpler and currently less preferred embodiments, for example by providing a lower number of heating plates and/or by omitting one or more of the other components.

For example, the liquid applying device 71 and/or the tension regulator 53 and/or a heating plate, for example the heating plate 31 or the heating plate 29, or in some cases the plate 25, may be omitted along the feed path P1 of the first paper web N1. By removing any one of the two heating plates 25, 29 and leaving the other one in combination with the heating plate 31, the two opposite faces of the paper web N1 are heated.

Along the feed path P2 of the second paper web N2 the liquid applying device 81 and/or the tension regulator 61 and or a heating plate, for example the heating plate may be omitted. In other embodiments, the heating roller 37 is omitted and/or is replaced by a further heating plate.

Figure 8:
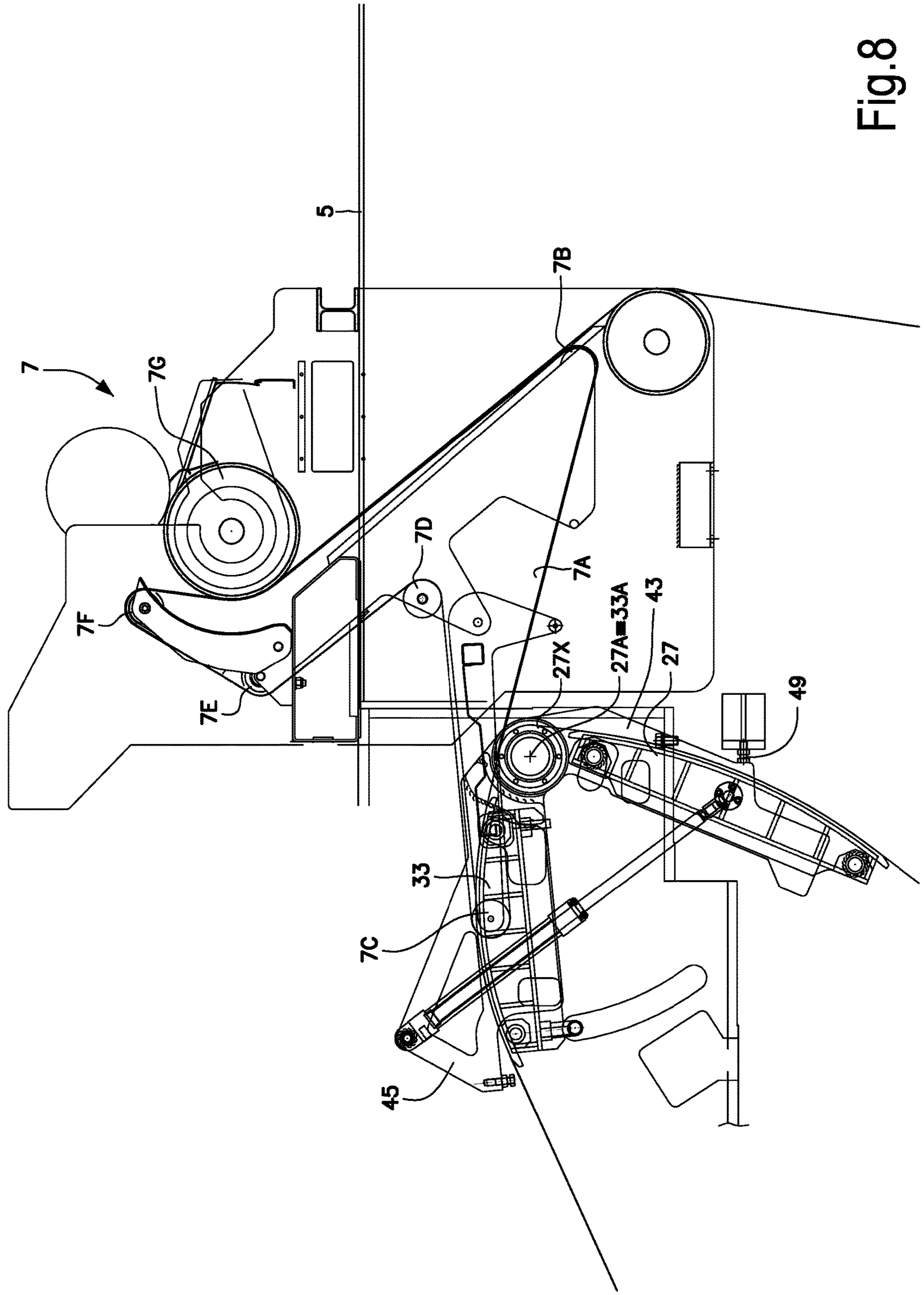
FIG. 8 is a side view of an upper portion of the single facer and the respective lifting device for lifting the single face corrugated board onto the bridge.

In some embodiments, the lifting device 7 lifting the single face corrugated board NS up to the bridge 5 can co-act with the system of heating plates described above. This configuration is illustrated in FIG. 8, where equal numbers indicate equal or equivalent parts to those illustrated in FIGS. 1 to 7, that will not be described again. The device 7 may be substantially as disclosed in EP3599196, the content whereof is fully included in the present disclosure. A continuous flexible member 7A of the lifting device 7, useful for inserting the leading edge of the web of single face corrugated board into the device 7 in order to lift it up to the bridge 5, is driven around return rollers 7B, 7C, 7D, 7E, 7F, as well as around the idle roller 27X. In this way, by actuating the continuous flexible member 7A also threading of the paper web N2 is facilitated. As disclosed in EP3599196, the continuous flexible member 7A may be adequately motorized and form a nip for inserting the web of single face corrugated board NS by pressing against a roller 7G of the device 7.

The invention has been described above in various embodiments. It is however clearly apparent to those skilled in the art many modifications, changes and omissions can be done to the invention without however departing from the protective scope as defined in the attached claims. The reference numbers in the attached claims have the only purpose of facilitating reading thereof and do not limit the protective scope of the invention.

The invention claimed is:

1. A single facer comprising:

a bearing structure;

a first feed path for feeding a first paper web towards a corrugating nip formed between a first corrugating roller and a second corrugating roller;

a first heating system provided along the first feed path and adapted to heat the first paper web upstream of the corrugating nip;

a second feed path for feeding a second paper web towards a pressure nip formed between the first corrugating roller and a pressure member co-acting with the first corrugating roller;

a second heating system provided along the second feed path and adapted to heat the second paper web upstream of the pressure nip;

a glue dispenser co-acting with the first corrugating roller and adapted to apply glue to crests formed on the first web paper by the first corrugating roller and the second corrugating roller;

wherein the first heating system comprises at least a first heating plate and a second heating plate, and the second heating system comprises at least a third heating plate and a fourth heating plate; and wherein each of said first heating plate, said second heating plate, said third heating plate and said fourth heating plate has an active surface adapted to be in contact with a respective paper web; and wherein each of said first heating plate, said second heating plate, said third heating plate and said fourth heating plate is hinged to the bearing structure, so as to rotate around a respective adjusting axis for adjusting an angular position of a respective heating plate of the first heating plate, the second heating plate, the third heating plate, and the fourth heating plate, and is associated with an actuation device for adjusting the angular position of the respective heating plate relative to the respective adjusting axis; and wherein a respective one of the first feed path and the second feed path where the respective heating plate is provided is so configured that a change in the angular position of the respective heating plate results in a change of an arc of contact between the active surface of the respective heating plate and the respective one of the first paper web and the second paper web.

2. The single facer of claim 1, wherein the first heating system comprises a fifth heating plate having an active surface adapted to be in contact with the first paper web.

3. The single facer of claim 1, wherein at least two heating plates of the at least a first heating plate and a second heating plate of the first heating system are provided along the first feed path so that, whilst the single facer operates, one of said at least two heating plates is in contact with a first face of the first paper web and another of said at least two heating plates is in contact with a second face of the first paper web.

4. The single facer of claim 1, wherein the second heating system comprises a sixth heating plate having an active surface adapted to be in contact with the second paper web.

5. The single facer of claim 1, wherein the active surface of each of said first heating plate, said second heating plate, said third heating plate, and said fourth heating plate is curved and convex.

6. The single facer of claim 1, wherein along the first feed path a first tension regulator is provided, adapted to adjust tension of the first paper web.

7. The single facer of claim 6, wherein the first tension regulator is arranged between two consecutive heating plates along the first feed path.

8. The single facer of claim 6, wherein each of the first tension regulator and a second tension regulator along the second feed path comprises a take-up roller.

9. The single facer of claim 1, wherein along the second feed path a second tension regulator is provided, adapted to adjust tension of the second paper web.

10. The single facer of claim 1, wherein along the first feed path a humidifier is provided arranged between one of the at least a first heating plate and a second heating plate that is furthest downstream with respect to the feed direction of the first paper web and the corrugating nip defined between the first corrugating roller and the second corrugating roller.

11. A single facer comprising:

a bearing structure;

a first feed path for feeding a first paper web towards a corrugating nip formed between a first corrugating roller and a second corrugating roller;

a first heating system provided along the first feed path and adapted to heat the first paper web upstream of the corrugating nip;

a second feed path for feeding a second paper web towards a pressure nip formed between the first corrugating roller and a pressure member co-acting with the first corrugating roller;

a second heating system provided along the second feed path and adapted to heat the second paper web upstream of the pressure nip;

a glue dispenser co-acting with the first corrugating roller and adapted to apply glue to crests formed on the first web paper by the first corrugating roller and the second corrugating roller;

wherein the first heating system comprises at least a first heating plate and a second heating plate, and the second heating system comprises at least a third heating plate and a fourth heating plate; and wherein each of said first heating plate, said second heating plate, said third heating plate and said fourth heating plate has an active surface adapted to be in contact with a respective paper web; and wherein the third heating plate and the fourth heating plate are hinged around a common axis and are provided with an angular movement around the common axis for modifying an arc of contact between the second paper web and the third heating plate and the fourth heating plate.

12. The single facer of claim 11 comprising a common actuator for controlling rotation of each of said third heating plate and said fourth heating plate around the common axis.

13. The single facer of claim 12, wherein the third heating plate and the fourth heating plate co-act with abutment members configured so that the common actuator causes a sequential movement of the third heating plate and of the fourth heating plate.

14. A single facer comprising:

a bearing structure;

a first feed path for feeding a first paper web towards a corrugating nip formed between a first corrugating roller and a second corrugating roller;

a first heating system provided along the first feed path and adapted to heat the first paper web upstream of the corrugating nip;

a second feed path for feeding a second paper web towards a pressure nip formed between the first corrugating roller and a pressure member co-acting with the first corrugating roller;

a second heating system provided along the second feed path and adapted to heat the second paper web upstream of the pressure nip;

a glue dispenser co-acting with the first corrugating roller and adapted to apply glue to crests formed on the first web paper by the first corrugating roller and the second corrugating roller;

wherein the first heating system comprises at least a first heating plate and a second heating plate, and the second heating system comprises at least a third heating plate and a fourth heating plate; and wherein each of said first heating plate, said second heating plate, said third heating plate and said fourth heating plate has an active surface adapted to be in contact with a respective paper web; and wherein the active surface of each of said first heating plate, said second heating plate, said third heating plate, and said fourth heating plate has a convex cylindrical shape defined by a generatrix parallel to a respective adjusting axis of a circular cylindrical surface.

15. A single facer comprising:

a bearing structure;

a first feed path for feeding a first paper web towards a corrugating nip formed between a first corrugating roller and a second corrugating roller;

a first heating system provided along the first feed path and adapted to heat the first paper web upstream of the corrugating nip;

a second feed path for feeding a second paper web towards a pressure nip formed between the first corrugating roller and a pressure member co-acting with the first corrugating roller;

a second heating system provided along the second feed path and adapted to heat the second paper web upstream of the pressure nip;

a glue dispenser co-acting with the first corrugating roller and adapted to apply glue to crests formed on the first web paper by the first corrugating roller and the second corrugating roller;

wherein the first heating system comprises at least a first heating plate and a second heating plate, and the second heating system comprises at least a third heating plate and a fourth heating plate; and wherein each of said first heating plate, said second heating plate, said third heating plate and said fourth heating plate has an active surface adapted to be in contact with a respective paper web; and wherein each of said first heating plate, said second heating plate, said third heating plate, and said fourth heating plate comprises at least an inner chamber for circulation of steam, and is arranged so as to collect condensate generated by steam cooling in a condensate accumulation area that is arranged so that the condensate collected does not reduce heat exchange through a respective active surface; wherein the concentrate accumulation area is adjacent to one end of the first heating plate, the second heating plate, the third heating plate, and/or the fourth heating plate.

16. A single facer comprising:

a bearing structure;

a first feed path for feeding a first paper web towards a corrugating nip formed between a first corrugating roller and a second corrugating roller;

a first heating system provided along the first feed path and adapted to heat the first paper web upstream of the corrugating nip;

a second feed path for feeding a second paper web towards a pressure nip formed between the first corrugating roller and a pressure member co-acting with the first corrugating roller;

a second heating system provided along the second feed path and adapted to heat the second paper web upstream of the pressure nip;

a glue dispenser co-acting with the first corrugating roller and adapted to apply glue to crests formed on the first web paper by the first corrugating roller and the second corrugating roller;

wherein the first heating system comprises at least a first heating plate and a second heating plate, and the second heating system comprises at least a third heating plate and a fourth heating plate; and wherein each of said first heating plate, said second heating plate, said third heating plate and said fourth heating plate has an active surface adapted to be in contact with a respective paper web; and wherein along the first feed path a first liquid applying device is positioned, upstream of at least one of said first heating plate and said second heating plate; the liquid applying device being adapted to apply a liquid to a surface of the first paper web.

17. The single facer of claim 16, wherein the first liquid applying device is arranged in the first feed path to apply liquid to a surface of the first paper web facing the first corrugating roller.

18. The single facer of claim 16, wherein a guide member is associated with each of said first liquid applying device and a second liquid applying device provided along the second feed path, the guide member being adapted to impart, to a respective paper web, a trajectory selectively in contact or not in contact with the liquid applying device.

19. The single facer of claim 16, wherein each of said first liquid applying device and a second liquid applying device provided along the second feed path is arranged upstream of the first heating plate, the second heating plate, the third heating plate and the fourth heating plate with respect to a feed direction of a paper web along a respective one of the first feed path and the second feed path where the liquid applying device is provided.

20. The single facer of claim 16, wherein each of said first liquid applying device and a second liquid applying device along the second feed path comprises a motorized application roller with an adjustable rotation speed.

21. The single facer of claim 16, wherein at least one of said first liquid applying device and a second liquid applying device along the second feed path is so arranged as to apply a liquid to a face of a respective paper web coming in contact with the active surface of a respective heating plate directly downstream of the first liquid applying device or the second liquid applying device with respect to the feed direction of the respective paper web.

22. The single facer of claim 16, wherein the first liquid applying device is arranged along the first feed path so as to apply the liquid to a surface of the first paper web that, in the corrugating nip, is in contact with the first corrugating roller.

23. A single facer comprising:

a bearing structure;

a first feed path for feeding a first paper web towards a corrugating nip formed between a first corrugating roller and a second corrugating roller;

a first heating system provided along the first feed path and adapted to heat the first paper web upstream of the corrugating nip;

a second feed path for feeding a second paper web towards a pressure nip formed between the first corrugating roller and a pressure member co-acting with the first corrugating roller;

a second heating system provided along the second feed path and adapted to heat the second paper web upstream of the pressure nip;

a glue dispenser co-acting with the first corrugating roller and adapted to apply glue to crests formed on the first web paper by the first corrugating roller and the second corrugating roller;

wherein the first heating system comprises at least a first heating plate and a second heating plate, and the second heating system comprises at least a third heating plate and a fourth heating plate; and wherein each of said first heating plate, said second heating plate, said third heating plate and said fourth heating plate has an active surface adapted to be in contact with a respective paper web; and wherein along the second feed path a second liquid applying device is provided, adapted to apply a liquid to a surface of the second paper web.

24. The single facer of claim 23, wherein the second liquid applying device is arranged in the second feed path to apply liquid to a surface of the second paper web facing the first corrugating roller.

25. The single facer of claim 23, wherein the second liquid applying device is arranged along the second feed path to apply the liquid to a surface of the second paper web that, in the pressure nip, faces the first corrugating roller.

* * * * *